(12) United States Patent
Bodensjö et al.

(10) Patent No.: US 7,587,600 B2
(45) Date of Patent: Sep. 8, 2009

(54) LOADING DATA ONTO AN ELECTRONIC DEVICE

(75) Inventors: Marcus Bodensjö, Malmö (SE); Harro Osthoff, Nürnburg (DE); Patrik Schalin, Lund (SE); Bernard Smeets, Dalby (SE)

(73) Assignee: Telefonaktiebolaget L M Ericsson (Publ.), Stockholm (SE)

( * ) Notice: Subject to any disclaimer, the term of this patent is extended or adjusted under 35 U.S.C. 154(b) by 536 days.

(21) Appl. No.: 10/527,031

(22) PCT Filed: Sep. 8, 2003

(86) PCT No.: PCT/EP03/10088

§ 371 (c)(1),
(2), (4) Date: Oct. 21, 2005

(87) PCT Pub. No.: WO2004/025896

PCT Pub. Date: Mar. 25, 2004

(65) Prior Publication Data

US 2006/0236111 A1    Oct. 19, 2006

Related U.S. Application Data

(60) Provisional application No. 60/412,374, filed on Sep. 20, 2002, provisional application No. 60/414,129, filed on Sep. 27, 2002.

(30) Foreign Application Priority Data

Sep. 16, 2002   (EP)   .................................. 02388063
Sep. 23, 2002   (DK)   ............................... 2002 01394

(51) Int. Cl.
H04L 9/32    (2006.01)
H04L 9/00    (2006.01)
G06F 11/30   (2006.01)
G06F 12/14   (2006.01)
G06Q 10/00   (2006.01)
H04L 29/06   (2006.01)

(52) U.S. Cl. ........................ 713/176; 713/155; 713/173; 713/191; 713/194; 380/30; 705/28

(58) Field of Classification Search ................. 713/176, 713/173; 380/30
See application file for complete search history.

(56) References Cited

U.S. PATENT DOCUMENTS 5,363,447 A * 11/1994 Rager et al. .................. 380/273
6,026,293 A *  2/2000 Osborn ....................... 455/411
6,167,521 A   12/2000 Smith et al.

(Continued)

Primary Examiner—Ayaz R Sheikh
Assistant Examiner—Sarah Su
(74) Attorney, Agent, or Firm—Michael Cameron

(57) ABSTRACT

A method of protecting an electronic device from unauthorized reprogramming, the electronic device comprising a data memory and a key memory, the method comprising loading into the key memory a predetermined public key of a cryptographic public key mechanism for verifying subsequent data items to be loaded into the data memory, the subsequent data items being signed with a corresponding private key; characterized in that the method further comprises setting a permanent identifier in the electronic device, the permanent identifier including an identifier identifying an entity authorized to reprogram the electronic device and an indicator identifying a selected one of a number of categories of public keys.

30 Claims, 5 Drawing Sheets

U.S. PATENT DOCUMENTS

| | | | |
|---|---|---|---|
| 6,226,618 B1 * | 5/2001 | Downs et al. | 705/1 |
| 6,761,319 B2 * | 7/2004 | Peachman et al. | 235/492 |
| 7,089,419 B2 * | 8/2006 | Foster et al. | 713/166 |
| 7,107,462 B2 * | 9/2006 | Fransdonk | 713/193 |
| 7,428,638 B1 * | 9/2008 | Chen et al. | 713/168 |
| 7,461,249 B1 * | 12/2008 | Pearson et al. | 713/156 |
| 2002/0032665 A1 * | 3/2002 | Creighton et al. | 705/76 |
| 2002/0050528 A1 | 5/2002 | Everett et al. | |
| 2003/0046566 A1 * | 3/2003 | Holopainen | 713/193 |
| 2004/0076295 A1 * | 4/2004 | Kojima et al. | 380/201 |
| 2005/0273862 A1 * | 12/2005 | Benaloh et al. | 726/26 |
| 2006/0031676 A1 * | 2/2006 | Vantalon et al. | 713/176 |

* cited by examiner

LOADING DATA ONTO AN ELECTRONIC DEVICE

This patent application claims the benefit of priority from U.S. Provisional Patent Application Ser. No. 60/412,374 filed on Sep. 20, 2002, and U.S. Provisional Patent Application Ser. No. 60/414,129 filed on Sep. 27, 2002. This application incorporates by reference the entire disclosure of U.S. Provisional Patent Application Ser. Nos. 60/412,374 and 60/414,129.

This invention relates to the loading of data, in particular software, into electronic devices. More particularly, the invention relates to the loading of data into an electronic device comprising a data memory for storing data items and a key memory for storing at least one cryptographic key of a cryptographic public key mechanism. The invention further relates to the protection of such an electronic device from unauthorised reprogramming.

Many modern electronic devices, such as mobile terminals, comprise memory for loading software and/or data for use with the electronic device. Typically, a manufacturer of such electronic devices delivers the device with or without some preinstalled software and/or data to a customer who further customises the electronic device prior to delivering the device to an end-user.

Consequently, during production of the electronic device in a factory, software and/or data is loaded into the device, such as test software, pre-installed software to be delivered with the device, or the like. Furthermore, after production of the electronic device, further software and/or data is loaded by the customer, such as customer-specific software, e.g. for providing customer-specific services, etc.

Several methods to load software (SW) into a programmable device are known. However, existing methods have been designed to deal with secure software handling under the assumption that the producer of the electronic device, e.g. a central processing unit of some electronic equipment, coincides with the producer of the final equipment, or that this unit is a standard component. If different manufacturers of electronic equipment buy the processing unit from a device manufacturer, they typically each have to load SW in their respective final equipment. An example of such a scenario is the production of a mobile telephone platform, e.g. a chipset, which is sold to a plurality of manufacturers of mobile phones, PDAs, or the like. In such a scenario, each end-product manufacturer should be prevented from loading SW of another end-product manufacturer into the equipment.

Throughout this document, the term customer comprises any entity which receives the produced electronic device. Typically, a customer is another enterprise or company which customises the electronic device, incorporates it into other electronic equipment, and/or sells it via corresponding distribution channels to end-users. For example, the electronic device may be a board to be incorporated into a mobile phone by a phone manufacturer. In this example, the customer of the electronic device is the phone manufacturer.

In the following the electronic device delivered to the customer from the factory will be referred to as the product, in contrast to the electronic device during production in the factory.

U.S. Pat. No. 6,167,521 discloses a method of loading new code into a logical subregion of a device which is controlled by an authority. According to this prior art method, the authority prepares a message comprising the new code and certain parameters which specify requirements on the execution environment for the new code to run. The authority sends the generated message to the device which, upon receipt of the message, performs an authentication of the authority and verifies whether the parameters are valid for the current execution environment. If yes, the device loads the received new code into the corresponding logical subregion.

However, the above prior art method does not address the problem that, for security reasons, when producing electronic devices it is desired to separate production and subsequent customer-specific customisation. For example, the manufacturer of a board to be incorporated into a mobile phone may wish to limit the possibilities of a customer of that board, e.g. a phone manufacturer, to customise the product, i.e. the board. Furthermore, a customer may not wish any customer-specific product software which the customer may have loaded into the device, i.e. the board, to be available for other parties, e.g. other phone manufacturers which are customers of the manufacturer of the board.

Hence, the tools used for loading software in the factory should not work with the product once it has left the factory and, vice versa, the tools used in connection with the product outside the factory should not be used during production inside the factory.

It is known to secure such loading tools by physical hardware devices, such as hardlocks, smart cards, dongles, or the like. According to such prior art solutions, a loading tool only allows operation, if a corresponding external device is connected to the loading tool, e.g. a smart card inserted in or a dongle connected to a predetermined port of the tool, etc.

However, the use of such physical devices has a number of problems: The handling and control of such devices generate a lot of overhead, as they have to be inserted and removed from the loading tools, stored in a secure place, etc. Furthermore, these devices are typically small and may, therefore, easily get lost or even stolen, thereby posing a security risk. Furthermore, modern electronic devices often have rather short life cycles. Consequently, a considerable number of different versions of electronic equipment and/or the corresponding software and/or the corresponding loading tools may exist, in many cases even simultaneously. Hence, as the tools get more complicated they may depend on different versions of the physical devices, thereby increasing the complexity of version handling and maintenance of the loading tools and the physical devices.

Hence, it is an object of the present invention to provide a secure loading of data into an electronic device during different stages of the life cycle of the device.

According to a first aspect of the invention, the above and other objects are achieved by a method of loading data into an electronic device comprising a data memory for storing data items and a key memory for storing at least one cryptographic key of a cryptographic public key mechanism, the method comprising loading a factory public key into the key memory;
loading factory software signed with a factory private key corresponding to the factory public key into the data memory;

where the method is characterised in further comprising
loading into the key memory a product public key different from the factory public key for verifying subsequent data items to be loaded into the data memory after delivering the electronic device to a customer, the subsequent data items being signed with a corresponding product private key; and
disabling the factory public key prior to delivering the electronic device to the customer.

Consequently, a division between tools used in the factory and the tools used with the product outside the factory is achieved by using a special factory cryptographic key and a product cryptographic key. All software loaded in the factory is signed with a corresponding factory private key and all software loaded into the electronic device outside the factory is signed with a product private key. According to the invention, the factory public key is disabled at the end of the production, thereby ensuring that factory software signed with the factory private key cannot be loaded into the product outside the factory any longer. Likewise, any software signed with the product private key will be rejected during production in the factory.

It is an advantage of the invention that the use of different keys for production of an electronic device and for the resulting product electronic device ensures that production software can only be loaded during production and product software can only be loaded into the finished product. Consequently, the signed software used in production does not need to be protected further, since it cannot be used outside the factory, thereby greatly simplifying the handling and control of the production software in the factory.

It is a further advantage of the invention that it provides a simple key structure, thereby avoiding the need of maintaining and storing a complicated key structure in the electronic device. This is especially advantageous when the electronic device has limited storage and/or processing resources, as is the case for mobile terminals and the like.

When the factory keys or the product keys are indicative of a predetermined entity, e.g. a manufacturer, it is ensured that one entity cannot load software/data into an electronic device related to another entity, e.g. another manufacturer's device.

When the method further comprises the step of setting a protectable identifier in the electronic device indicative of a completion of a production process, a mechanism is provided for securely determining whether a given device has completed a predetermined stage of the production process. For example, setting the protectable identifier may indicate the end of the production process in the factory. Since the identifier is protectable, i.e. can be permanently set, it can be ensured that the device does not re-enter the factory process once it has left it. Preferably, the protectable identifier identifies the customer, thereby ensuring that a customer cannot load another customer's software/data, even if the cryptographic keys have been modified.

In a preferred embodiment, the step of loading the factory public key comprises the steps of detecting whether the protectable identifier is set;

if the protectable identifier is set, aborting the step of loading the factory public key; otherwise loading the factory public key.

It is an advantage that the tools used during the factory process which sign any data to be loaded into the device with the factory private key can only be used during the production process. Once the factory public key is disabled in the device and the protectable identifier is set, a re-loading of the factory public key is prevented, thereby increasing the security of the method. Hence, it is an advantage that the protectable identifier protects against removal of keys from non-volatile memory of the electronic device.

In a further preferred embodiment, the step of loading the product public key comprises the steps of detecting whether the protectable identifier is set;

if the protectable identifier is set, loading the product public key; otherwise aborting the step of loading the product public key.

Hence, the product public key cannot be loaded before completion of the production process as indicated by setting of the protectable identifier, thereby preventing the use of post-production tools during the production process. By enforcing a strict division between production tools and post-production tools, the risk of misuse or erroneous use of tools is further reduced.

Alternatively, the protectable identifier may be loaded at other stages of the production process, for example as an initial step of the process before loading the factory public key, or as a final step after exchanging the factory public key with the product public key, or as an intermediate step after loading the factory public key but before loading any factory software, or at another suitable stage of the production process.

For the purpose of the present description, the term protectable identifier comprises any identifier which may be set in the device and which may be protected against deletion and alteration. Hence, the protectable identifier cannot—with reasonable effort—be changed or erased, once it is set and protected. Preferably, the identifier uniquely identifies the device. Examples of such a protectable identifier include but are not limited to fuses burnt electrically, by means of a laser, or the like, charge memory, encapsulated permanent capacitors, one-time-programmable (OTP) memory, etc., or a combination thereof. In one embodiment, the protectable identifier may be related to the product public key. For example, the product public key may be stored in OTP memory, thereby functioning both as the product public key and the protectable identifier. Hence, an increased security is achieved by storing a public key into the key memory, e.g. flash memory, protected by a hardware mechanism, e.g. in the central chipset In a preferred embodiment the electronic device is a mobile telephone having associated with it an International Mobile Equipment Identity; and the protectable identifier comprises the International Mobile Equipment Identity and a further identifier stored in a one time programmable arrangement. Hence a high level of security is provided and the device is uniquely identified. Furthermore, the protectable identifier (or part of the protectable identifier) stored in the OTP memory may have a small size, e.g. 64 bits or less, thereby reducing the cost for the required OTP memory.

It is an advantage of the invention that the factory private key is only known to the manufacturer of the electronic device, thereby ensuring that other manufacturers cannot load their software into these devices.

The factory public key may be disabled by removing the key from memory, e.g. by setting all corresponding bits to zero or by overwriting it with the product public key; it may be disabled by corrupting it, e.g. by altering one or more bits of the stored key, or it may be disabled in any other suitable way, thereby preventing its subsequent use for verifying signed data items. Preferably, the factory public key is permanently disabled, i.e. making it computationally infeasible to reconstruct the key, thereby increasing the security of the method. In one embodiment, both the factory public key and the product public key are stored in the beginning of the factory process, and the factory public key is disabled at the end of the factory process, thereby only leaving the product public key enabled.

When there is a subsequent need for re-customisation of a device after completion of the production process, access to some or all of the production tools may be granted. However, when granting access to factory tools after completion of the production process, it is a general problem to maintain the security of the system.

This problem is solved when the method further comprises the step of loading a hash value of a secret data item into the key memory. Consequently, a re-customisation tool, preferably different and separate from the factory tools, may be provided, where the re-customisation tool knows the secret data item. Hence, a re-customisation of the device may be performed in a controlled environment while maintaining the security of the system and the distinction between production and post-production processes/tools.

A re-customisation may, for example, comprise changing language settings, country-specific settings, or the like. Hence, a re-customisation may, for example, be necessary when the customer wishes to deliver the device, e.g. as a part of another electronic equipment, to end-users of a different country, market, etc.

During the development of new electronic devices it is common to initially produce a number of prototypes, for example to allow third party providers to test software in connection with a new device. In such a situation it is desirable that the prototypes are also covered by the security mechanisms of the production process. However, it is usually not desired that the subsequent product tools used for the actually released products are also usable for the prototypes, and vice versa.

Consequently, in a preferred embodiment the step of loading a product public key further comprises the step of loading a digital certificate comprising the product public key, the digital certificate being associated with a validity period limiting the validity of the public key, thereby limiting the validity of the prototype key to a predetermined validity period.

In another preferred embodiment, the step of loading a product public key further comprises the step of loading a digital certificate comprising the product public key; and the method further comprises the step of subsequently invalidating the digital certificate by sending a predetermined message to the electronic equipment. Hence, it is an advantage that no validity period needs to be predefined, thereby it is possible to easily account for delays in the development and testing process of the prototypes. The message sent to the device may, for example, be a message of a Short Message Service (SMS) or another message service, or another secured indication to achieve deactivation via an over-the-air transport mechanism.

In another embodiment, the product public key is selected from a predetermined set of customer public keys, thereby providing a mechanism for differentiating different products, products from prototypes, and/or different customers.

In one embodiment, the public keys are stored in relation with a digital certificate comprising the corresponding public key.

The invention further relates to an electronic device having stored therein data that has been loaded into the electronic device by performing the steps of the method described above and in the following.

The invention further relates to a method of re-customising an electronic device having stored therein data that has been loaded into the electronic device by performing the steps of the method described above and in the following, the method comprising the steps of
 detecting whether a protectable identifier is set in the electronic device;
 obtaining the hash value of the secret data item from the key memory;
 comparing the obtained hash value with a reference hash value calculated from a reference secret data item; and
 if the protectable identifier is set and if the obtained hash value corresponds to the calculated reference hash value, initiating loading re-customisation data signed with the product private key into the electronic device; otherwise aborting re-customising the electronic device.

For the purpose of the present description, the step of detecting whether the protectable identifier is set may comprise a detection whether the identifier has a predetermined value and/or other property.

The invention further relates to a system for re-customising an electronic device having stored therein data that has been loaded into the electronic device by performing the steps of the method described above and in the following, the system comprising a loader module adapted to perform the steps of the method of re-customising an electronic device described above and in the following.

The invention further relates to a system for loading data into an electronic device, the electronic device comprising a data memory for storing data items and a key memory for storing at least one cryptographic key of a cryptographic public key mechanism, the system comprising
 a first loader module for loading a factory public key into the key memory;
 a second loader module for loading factory software signed with a factory private key corresponding to the factory public key into the data memory;
 a third loader module adapted to load into the key memory a product public key different from the factory public key for verifying subsequent data items to be loaded into the data memory after delivering the electronic device to a customer, the subsequent data items being signed with a corresponding product private key; and to disable the factory public key prior to delivering the electronic device to the customer.

The invention further relates to a computer program comprising code means adapted to perform the following steps in a method of loading data into an electronic device, the device including a data memory for storing data items and a key memory for storing at least one cryptographic key of a cryptographic public key mechanism:
 loading into the key memory a product public key for verifying subsequent data items to be loaded into the data memory after delivering the electronic device to a customer, the subsequent data items being signed with a corresponding product private key; the product public key being different from a factory public key stored in the key memory and used for verifying any factory software to be loaded into the data memory and signed with a factory private key corresponding to the factory public key; and
 disabling the factory public key prior to delivering the electronic device to the customer.

The computer program may be embodied on a computer-readable medium such as magnetic tape, optical disc, digital video disk (DVD), compact disc (CD or CD-ROM), mini-disc, hard disk, floppy disk, ferro-electric memory, electrically erasable programmable read only memory (EEPROM), flash memory, EPROM, read only memory (ROM), static random access memory (SRAM), dynamic random access memory (DRAM), synchronous dynamic random access memory (SDRAM), ferromagnetic memory, optical storage, charge coupled devices, smart cards, PCMCIA card, etc.

According to a second aspect of the invention the above and other objects are achieved by a method of protecting an electronic device from unauthorised reprogramming, the electronic device comprising a data memory and a key memory, the method comprising loading into the key memory a predetermined public key of a cryptographic public key mechanism for verifying subsequent data items to be loaded into the data memory, the subsequent data items being signed with a corresponding private key; wherein the method further comprises setting a protectable identifier in the electronic device, where the protectable identifier identifies an entity authorised to reprogram the electronic device.

By setting a protectable identifier in the electronic device, the protectable identifier identifying an entity authorized to reprogram the electronic device, an unauthorised customer is prevented from loading the customer's own key into the key memory, which would then allow the customer to load the customers's own software. Hence, an increased security against unauthorised reprogramming of the device is achieved.

It is a further advantage of the invention that it provides a cost-effective solution for a secure enabling of predetermined parts of the functionality of the electronic device, namely those functions that have been licensed to the customer identified by the protectable identifier.

When the protectable identifier further identifies a selected one of a number of categories of public keys, the invention may be used to distinguish the production from the consumer product. This is advantageous, since national regulations in some countries require that production tools that can reprogram a (radio) device cannot run on a consumer product. This can be achieved by using one public certificate for production and another one for the consumer product and change to the public certificate for the consumer product at the end of the production. By specifying the entity authorized to reprogram the electronic device and the category of the certificate, a loader module can determine whether or not the loader module should function for a given product, e.g. a given mobile phone.

Furthermore, when the protectable identifier identifies an entity authorized to reprogram the electronic device and a selected one of a number of categories of public keys, a mechanism is provided for securely recovering from a situation where the public key in the electronic device has been destroyed or corrupted. Based on the information identified by the protectable identifier, a recovery module can determine which type of public key or certificate (e.g. production or a consumer product certificate) to reload, thereby maintaining a high level of security even in error recovery situations.

In a preferred embodiment, the protectable identifier is written into a one-time programmable (OTP) area of a flash memory of the electronic device, thereby enabling a loader module that loads software into the electronic device to uniquely determine the entity authorized to reprogram the electronic device, e.g. the authorized customer of the device. A small OTP memory for the protectable identifier ID on the central chip is preferable. In a preferred embodiment, the flash ID is bound to the used central chip by a suitable mechanism controlled by the control chip, thereby further increasing the security, since the flash is prevented from being replaced by a differently programmed flash.

Hence, it is an advantage that only a limited amount of data is required to be stored in the OTP memory, thereby reducing the required size of the OTP memory and, thus, production costs. In particular, this is an advantage, since the standard OTP memory sizes in current chipsets provide only 64-bit which is not sufficient for e.g. a public certificate. It is an advantage of the invention that it may be implemented with standard chipsets. Furthermore, OTP solutions differ between flash memory producers, and it is an advantage of the invention that it may be implemented with different types of OTP memory.

It is understood that, in some embodiments, a value derived from the protectable identifier is stored instead of the identifier itself. In particular, in a preferred embodiment, a cryptographic hash value derived from the protectable identifier is stored in the OTP memory, thereby providing an increased flexibility in the formatting of the protectable identifier.

It is understood that the management of public keys and OTP settings in a mass production environment may be a complex task. Accordingly, a further problem to be solved is how the security management should be organised, in particular if the security management should encompass the production of the electronic device in a factory as well as the end-product at the customer and the product development organization, which may be a third party, e.g. a subcontractor.

In a preferred embodiment at least one of the transitions between states in the security state diagram relate to a corresponding change in the protectable identifier, thereby providing an effective mechanism for the management of the security requirements in a product life cycle.

When the protectable identifier is stored in an OTP memory that is lockable by setting a lock flag, the status of said lock flag may be used as part of the identifier. For example, the lock status of an OTP or the IMEI of a mobile telephone may be used as a bit of information of the protectable identifier. For example the lock status may distinguish a device during production and an end-product.

The invention further relates to a method of loading data into an electronic device protected according to the method described above and in the following, the method comprising the steps of detecting whether the protectable identifier has a predetermined property; and if the protectable identifier has the predetermined property, loading the data, the data being signed with the private key corresponding to the public key stored in the device; otherwise aborting loading the data.

For the purpose of the present description, the predetermined property of the identifier may correspond to the identifier fulfilling a predetermined condition, e.g. the identifier being different from a predetermined value, the identifier being equal to a predetermined value or to one of a set or range of values, the identifier having a predetermined lock status, or the like.

The invention further relates to a system for loading data into an electronic device protected according to the method described above and in the following, the system comprising a loader module adapted to detect whether the protectable identifier has a predetermined property; and if the protectable identifier has the predetermined property, to load the data, the data being signed with the private key corresponding to the public key stored in the device; otherwise to abort loading the data.

It is a further advantage of the invention that it provides a method for securely loading data into an electronic device that is suitable for high volume production processes.

It is a further advantage of the invention that no extra tools, such as hardlocks, smart cards, dongles, or the like, are required to differentiate security relevant software/data load steps during different stages of the life cycle of a device, e.g. in the factory and outside the factory, thereby simplifying the control and maintenance of load tools.

In a preferred embodiment, the data memory and the key memory comprise selected blocks of a flash memory. Flash memory (sometimes also called "flash RAM") is a type of nonvolatile memory that can be erased and reprogrammed in units of memory called blocks. It is a variation of electrically erasable programmable read-only memory (EEPROM) which, unlike flash memory, is erased and rewritten at the byte level, which is slower than flash memory updating. Flash memory is often used to hold control code such as the basic input/output system (BIOS) in a personal computer. When data needs to be changed (rewritten) in flash memory, the flash memory can be written to in block (rather than byte) sizes, making it easy to update. Flash memory gets its name because the microchip is organized so that a section of memory cells are erased in a single action or "flash." Flash memory is widely used in digital cellular phones, digital cameras, LAN switches, PC cards for notebook computers, digital set-up boxes, embedded controllers, and other electronic devices.

Other examples of data memory and/or key memory include magnetic tape, optical disc, digital video disk (DVD), compact disc (CD or CD-ROM), mini-disc, hard disk, floppy disk, ferro-electric memory, electrically erasable programmable read only memory (EEPROM), EPROM, read only memory (ROM), static random access memory (SRAM), dynamic random access memory (DRAM), synchronous dynamic random access memory (SDRAM), ferromagnetic memory, optical storage, charge coupled devices, smart cards, PCMCIA card, etc.

Further preferred embodiments are disclosed in the dependant claims.

The present invention can be implemented in different ways including the methods described above and in the following, systems, electronic devices, and further product means, each yielding one or more of the benefits and advantages described in connection with the methods mentioned above, and each having one or more preferred embodiments corresponding to the preferred embodiments described in connection with the methods mentioned above and disclosed in the dependant claims.

The invention will be explained more fully below in connection with a preferred embodiment and with reference to the drawing, in which:

FIG. 1 schematically illustrates a production process and a re-customisation process according to an embodiment of the invention;

Figure 6:
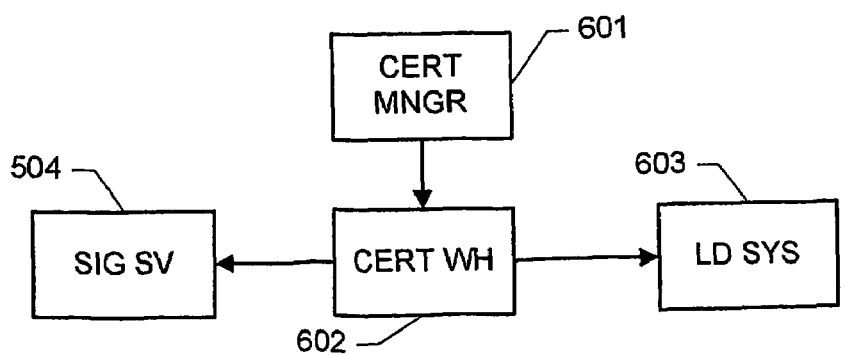
Figure 5A:
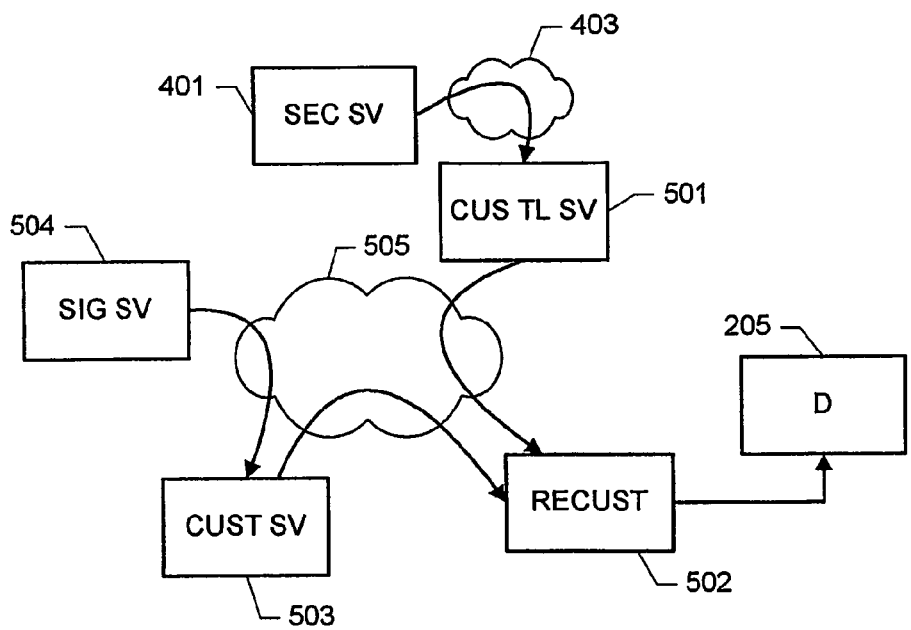
Figure 5B:
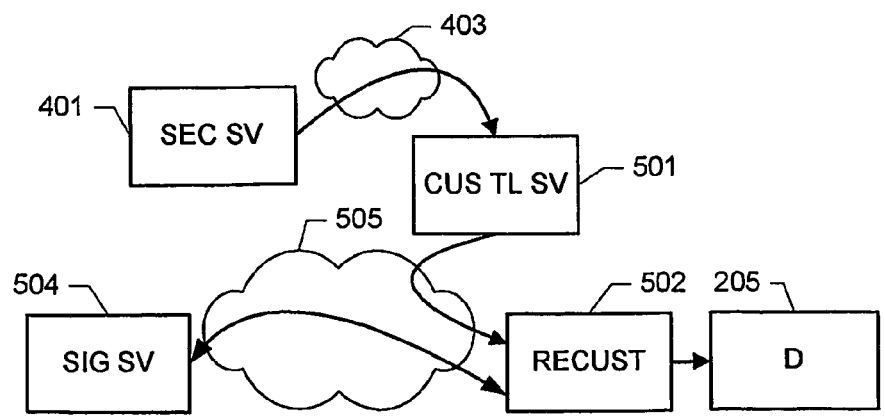
Figure 8:
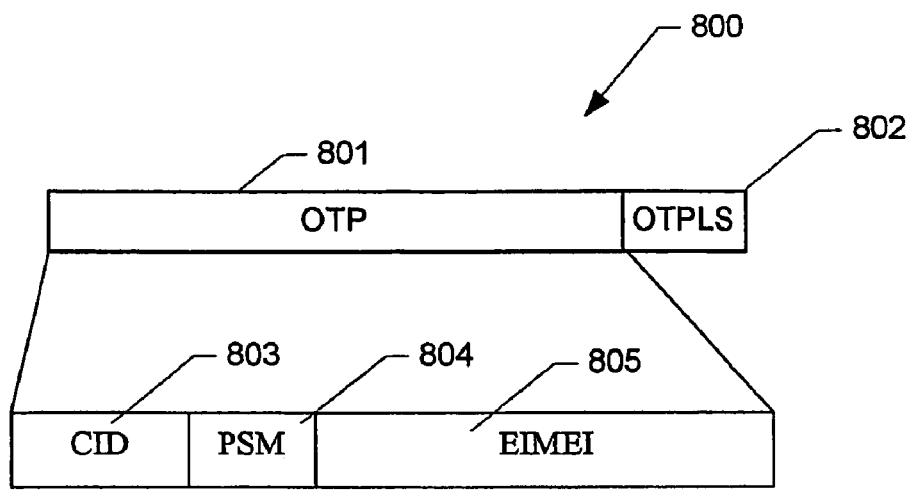
Figure 9:
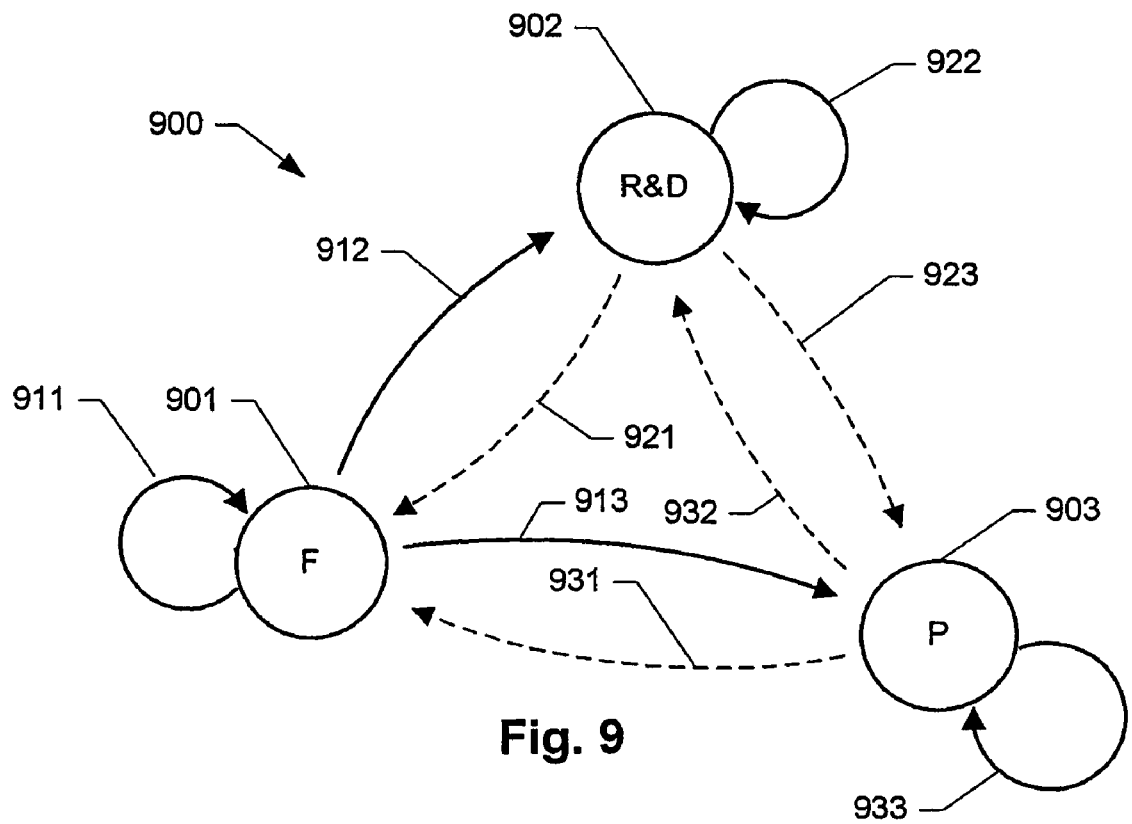

FIGS. 5a-b show block diagrams of embodiments of a system for re-customising an electronic device;

FIG. 6 shows a block diagram of a system for managing cryptographic keys and certificates;

FIGS. 7a-d illustrate examples of production processes according to corresponding embodiments of the invention;

FIG. 8 illustrates the structure of an embodiment of a protectable identifier; and FIG. 9 illustrates a security state diagram.

In the drawings, like reference signs refer to similar or corresponding components, steps, etc.

Figure 1:
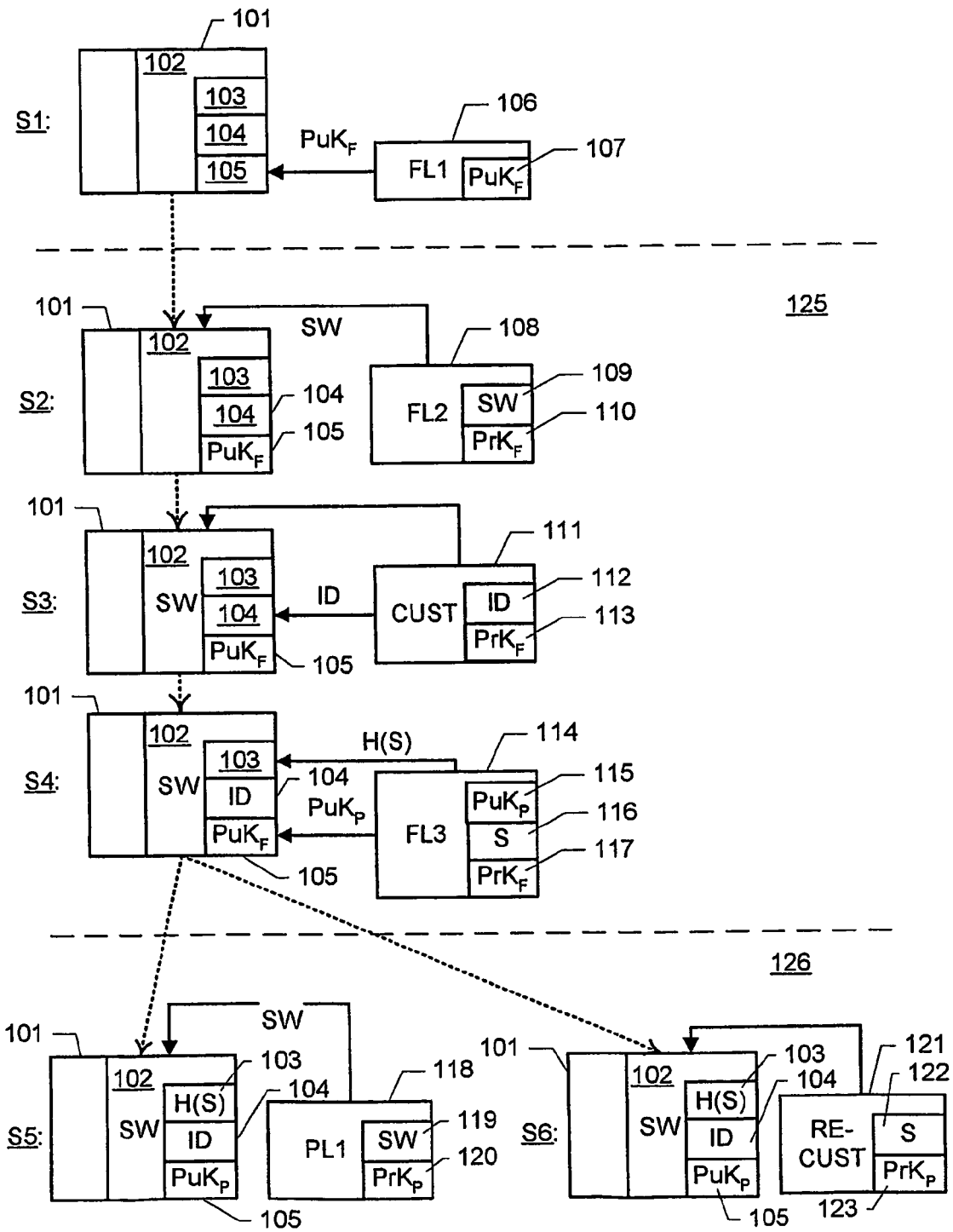

FIG. 1 schematically illustrates a production process and a re-customisation process according to an embodiment of the invention. In an initial step S1 of the production process an electronic device 101 is provided. In this embodiment, it is assumed that the electronic device includes a mounted board, i.e. during the production of a product for a customer, the described process may typically take place after completion of the surface mounting of electronic components on a board and before or during a final assembly step. The electronic device comprises a memory 102 including memory sections 103, 104 and 105. The memory 102 may include one or more different types of memory and/or one or more memory modules, such as EEPROM, Flash memory, on-chip memory, RAM, OTP memory, etc. The memory sections 103 and 105 may be addressable areas of a memory, such as flash memory. In a preferred embodiment, the memory section 104 is an OTP memory. In on embodiment, the memory 102 is a flash memory component including an OTP section.

During a first loading step a first factory loading tool 106 is used to load a factory public key $PuK_F$ into memory section 105. The loading tool 106 comprises memory 107 for storing the public key $PuK_F$.

Within the field of cryptography, the use of combined public and private keys as such is known as public-key or asymmetric cryptography. A system for using public keys is called a public key infrastructure (PKI). The very nature of public-key cryptography permits a form of digital message signing. A sender may publish a decryption key, i.e. the public key, and keeps a corresponding encryption key, i.e. the private key, secret. When the sender encrypts a message or a value derived from the message, anyone can decrypt it using the public decrypting key and, in doing so, the recipient can be sure that the message could only have been encrypted by the sender, since the sender is the sole possessor of the encryption key. Hence, the sender has effectively "signed" the message. Examples of public-key mechanisms include the RSA Cryptosystem (see e.g. Rivest, R., Shamir, A. and Adleman, L. "A method for obtaining digital signatures and public key cryptosystems." Communications of the ACM, 21 (1978), pp. 120-126) the ElGamal Cryptosystem (see e.g. ElGamal, T. "A public key cryptosystem and a signature scheme based on discrete logarithms." IEEE Transactions on Information Theory, 31 (1985), pp. 469-472) and elliptic curve cryptosystems (see e.g. Saeki, M., Elliptic Curve Cryptosystems. M.Sc. Thesis, McGill University School of Computer Science. 1996.).

Preferably, the public key is related to a digital certificate of the key issuer/owner, e.g. in the case of the factory public key of the manufacturer. Here the term digital certificate refers to a data item that serves to validate the senders authorization. The data item comprises an identification of the certificate holder and the holders public key and, preferably, a digital signature of a certification authority for authentication. The certification authority attests that the sender's identifier is the one associated with the public key in the data item. In the art, different types of public key certificates are known as parts of a public key infrastructure that deals with digitally signed documents, public key encryption, trusted third parties, and mechanisms for certificate publication and issuing, see e.g. the X509 standard (ITU-T Recommendation X.509 (1997), "Information Technology—Open Systems Interconnection—The Directory: Authentication Framework"). Hence, throughout the present description, the public keys are also referred to as (public) certificates, e.g. the factory public key will also be referred to as factory certificate. A compact format of a digital certificate will be described below. Hence, a digital certificate may be regarded as representing a binding between a public key and an entity, where the binding is certified by a signature from a trusted certification authority.

Preferably, prior to loading the factory certificate, the loading tool 106 attempts to read a valid factory certificate or a corresponding customer certificate, which will be described below, from memory section 105 and a predetermined protectable identifier from the OTP memory section 104. If no valid certificate can be read from memory section 105 and no protectable identifier can be read from OTP section 104, the loading tool loads the public key $PuK_F$, thereby ensuring that the electronic device has not previously undergone the factory process. It is understood that the detection of the absence of a protectable identifier may correspond to the detection of a default value of the identifier, e.g. ID='0', or the detection of a predetermined property of the identifier, e.g. the detection of a predetermined lock status, e.g. LockStatus='unlocked'. A embodiment of a format of a protectable identifier will be described below.

The loading tool 106 may further be used for other settings such as the downloading of calibration data, the setting of secure data areas by calculating a cryptographic hash over the area, or the like.

Once the factory certificate is successfully loaded, the electronic device 101 enters the secured factory production process 125.

It is noted that the step of loading the factory certificate may be performed in a pre-flash step prior to mounting the flash memory onto the main board of the electronic device.

During step S2 of the secure factory process 125, the electronic device 101 is tested and, if necessary, tuned, calibrated, or the like. For example, during production of a mobile telephone, the radio components may require tuning and calibration, the mounted electronic components may need to be tested, etc. For this purpose, factory software for testing, calibration, etc. is loaded into the memory 102 of the electronic device 101. The factory loading tool 108 for loading the factory software comprises memory 109 and 110 for storing the factory software and a factory private key $PrK_F$ 110, 113, 117, respectively. The factory private key $PrK_F$ 110, 113, 117 corresponds to the factory public key PuKF and is used by the loader 108 to sign the factory software prior to loading the factory software into the electronic device 101.

Prior to loading the signed factory software into the electronic device 101, the loading tool 108 attempts to detect a predetermined protectable identifier in the OTP section 104 of the electronic device. If no protectable identifier can be read from OTP section 104, the loading tool 108 loads the factory software, thereby ensuring that the electronic device has not previously undergone the factory process. Furthermore, the factory software is only accepted for loading and execution by the electronic device, if the electronic device successfully verifies the received software using the factory certificate $PuK_F$. Additionally or alternatively, other software and/or data may be loaded into the electronic device at this stage, for example an operating system and/or application software for use with the final product. The loading of this other software and/or data is performed as described above by loading tool 108 or a separate loading tool (not shown), where the software and/or date to be loaded is signed with the factory private key $PrK_F$ 110, 113, 117.

After successful testing of the electronic components, loading of application software, or the like, the electronic device is customised during step S3, i.e. the device is given a specific "identity". For example, this customisation step may be performed after the final physical assembly of the electronic device. During this step, software customisations are performed, such as loading of customer-specific software, country adaptations, etc. Furthermore, in the context of mobile terminals a number of known codes may be loaded, such as an unlock code, and IMEI, a customer code, etc. A customisation tool 111 performs the above customisation, e.g. by loading software and/or data, such as codes, and/or by performing other settings in the electronic device. According to the invention, the customisation loader signs any data or software to be loaded into the electronic device with the factory private key $PrK_F$ stored in a section 117 of the memory of the customisation tool. Furthermore, prior to performing the above customisations, the customisation tool 111 verifies that no identifier is set in the OTP memory section 104 of the electronic device. Hence, as described in connection with the previous step S2, a customisation by customisation tool 111 requires that the electronic device has a valid factory certificate stored in memory section 105 and that no protectable identifier is set in OTP section 104. In a preferred embodiment, the electronic device has associated with it an IMEI and the protectable identifier is a combination of the IMEI and a customer ID stored in OTP memory. As an IMEI may comprise approx. 15 characters, a combination of the IMEI with a short OTP customer ID, e.g. a 16 bit ID, provides a unique identification of the device and, at the same time, is protected against removal. Furthermore, the OTP memory usage of this embodiment is small.

Furthermore, during customisation step S3, a protectable identifier 112 is set in OTP memory section 104 of the electronic device and the identifier is protected against removal and modification, e.g. protected by setting a lock flag in the OTP memory. The loading of the ID indicates the completion of the secure production process. Since the previous loaders 106, 108, and 111 all require that no ID is set in the OTP section 104, it is ensured that the above factory tools cannot be applied to a device which has completed the production process.

At the end of the factory production process, a final loading step S4 is performed by a loading tool 114. The loading tool 114 verifies that a valid ID is set in the OTP section 104, thereby ensuring that the electronic device has completed the production process. The loader 114 loads a hash value H(S) of a secret value S into a memory section 103 of the electronic device. Preferably, the size of the hash value is at least 64 bits in order to ensure a suitable security. With current and non-distant state-of-the-art cryptoanalysis tools, 128 bits may be used. It is noted that the security is increased, if the secret value S is selected individually for every device, and if the calculation of the hash value is device-dependant, e.g. parameterised by a device identifier. It is further noted that, in some embodiments, the hash value of the secret value S may be comprised of several hash values. The hash value allows a subsequent secure re-customisation of the electronic device without re-entering the above secure production process. The loading tool may retrieve the secret value S from a memory section 116 of the loading tool 114 and calculate the corresponding hash value. Alternatively, the loading tool 114 may retrieve the secret value or the calculated hash value from another computer. Preferably, the hash value is signed with the factory private key $PrK_F$ 110, 113, 117. Finally, the loader 114 loads a product public key $PuK_P$ 115 into the memory section 105 of the electronic device, thereby disabling the previous factory certificate $PuK_F$ 110, 113, 117. Alternatively, the product public key may be loaded into a different memory section and the factory certificate may be disabled, e.g. by setting all or a predetermined subsets of its bits to zero.

Hence after completion of the production process, the electronic device includes application software in its memory 102, a non-removable ID in the OTP section 104, a hash value H(S) of a secret, and a product public key $PuK_P$.

At this stage, in steps S5 and S6, additional software and/or data 119 may be loaded into the electronic device using a product loading tool 118 having stored a product private key $PrK_P$ (120) corresponding to the product public key $PuK_P$ 115.

Hence, authorized product software/data signed with the product private key $PrK_P$ (120) is accepted by the electronic device. However, at this stage, any software/data signed with the factory private key $PrK_F$ 110, 113, 117 will be rejected by the electronic device. Consequently, a strict division of the production process 125 and the post-production process 126 is enforced, thereby ensuring that factory software or application software cannot be loaded by an unauthorized entity into an electronic device. Likewise any software/data signed with the product private key $PrK_F$ 110, 113, 117 of another customer, i.e. a private key that does not correspond to the public key stored in the device, will be rejected by the electronic device. Consequently, a customer cannot load the customer's own software into a device authorised for another customer. Furthermore, this ensures that tools of one customer do not work on devices of another customer.

However, it may be necessary to re-customise some of the settings performed during the production process or to perform other kinds of re-work, such as re-loading calibration software, or the like. Within the above described mechanism, the factory public key $PuK_F$ cannot be re-loaded, since the loader 106 requires that no OTP ID is set in memory section 104 of the electronic device. Furthermore, allowing such a re-loading of the factory public key would involve the risk of misuse.

According to the invention, a re-customisation may be performed using a special re-customisation tool 121 which has access to the secret S (122) and the product private key $PrK_P$ (123). The re-customisation tool verifies that a valid ID is set in OTP section 104. Furthermore, the re-customisation requires that a hash value calculated from the secret S in the customisation tool corresponds to the hash value H(S) stored in the electronic device. This may be verified by the customisation tool or by the electronic device. Finally, any data/software sent to the electronic device during re-customisation is signed with the product private key $PrK_P$, thereby providing a secure re-customisation process which avoids a re-entering into the secure factory process 125, thereby enforcing a strict division between production process and post-production process.

The above public and private keys may be keys of any suitable public key mechanism, such as RSA or Elliptic Curve Cryptography (ECC). The mechanism for the factory and the product keys may be the same or different mechanisms.

Furthermore, it is understood, that the data/software loaded into the electronic device may be signed by the respective loading and customisation tools 108, 111, 114, 118, or 121, or it may be signed by a remote computer and the signed data/software may be communicated to the corresponding loading or customisation tool which performs the actual loading.

It is understood that the software and/or data may be compressed before loading it into the electronic device in order to reduce the loading time. Furthermore, it is understood that the software and/or data may be encrypted using a suitable private or public key encryption mechanism, thereby further increasing the security of the production process.

The loading and customisation tools may be special hardware devices or circuits, or they may be implemented as computer programs executed on a data processing system, such as a standard PC, or they may be implemented as a combination thereof. Hence, within this document, the terms loading station and loading tool are used interchangeably. Furthermore, the cryptographic keys of the loading and customisation tools may be stored on a corresponding removable medium, such as a CD ROM, a smart card, etc. For example, the keys and the cryptographic signing software may be implemented on a smart card which may be removably inserted in the loading tool.

It is understood that several modifications of the above process are possible within the scope of the invention. For example, some of the above tools may be combined in a single tool or the division of functions of the tools may be divided between the different tools in a different manner. For example tools 108 and 111 may be combined to one tool or the tools 111 and 114 may be combined to a single tool. Furthermore, some of the loading steps may be performed in a different order. For example, the hash value H(S) may be loaded during a previous loading step, e.g. by customisation tool 111.

Figure 2:
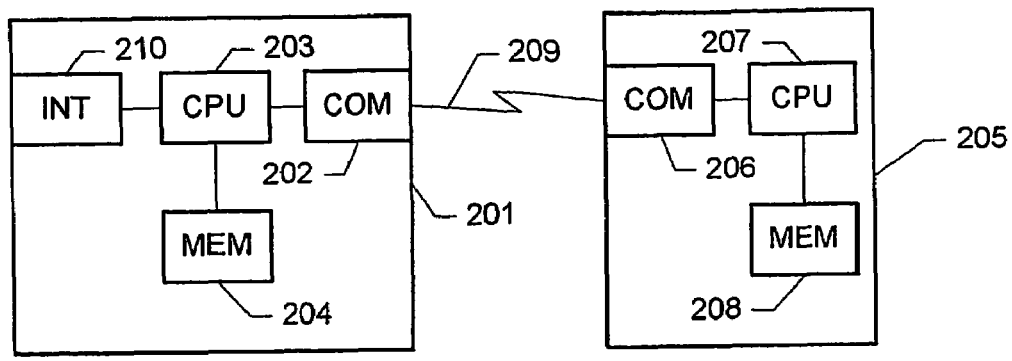
FIG. 2 shows a block diagram of a system for loading data into an electronic device.

FIG. 2 shows a block diagram of a system for loading data into an electronic device. The system comprises a loading station 201 and an electronic device 205. The loading station comprises a storage medium 204 for storing the payload data to be loaded into the electronic device and other data for use in the processing of the payload data, such as cryptographic keys, address information, etc. The loading station further comprises a processing unit 203 which is adapted, e.g. by software loaded from the storage medium 204, to process the payload data, e.g. compress and/or encrypt the payload data and/or divide it into smaller segments, generate header data, etc. Furthermore, the processing unit is adapted to control the transmission of the data to the mobile station 205. The processing unit 203 may comprise a general- or special-purpose programmable microprocessor, Digital Signal Processor (DSP), Application Specific Integrated Circuit (ASIC), Programmable Logic Array (PLA), Field Programmable Gate Array (FPGA), etc., or a combination thereof. The loading station further comprises a communications unit 202 comprising circuitry and/or devices suitable for enabling the loading station to communicate data with the electronic device via a wired or wireless communications link 209 such as a direct data link, a communications network, or the like. Examples of such communications units include a network interface, a network card, a radio transmitter/receiver, a Bluetooth transceiver, a serial port, a parallel port, an infrared port, an IrDa port, a cable modem, a telephone modem, an Integrated Services Digital Network (ISDN) adapter, a Digital Subscriber Line (DSL) adapter, a satellite transceiver, an Ethernet adapter, or the like. Accordingly, the communications link 209 may be a short-range wireless communications link using electromagnetic waves. Examples of such communications links include a Bluetooth connection or another connection based on radio frequencies, infrared, microwave, or the like. The communications link may further be a wired connection, e.g. a serial connection, and USB connection, or the like. In yet another embodiment, the connection may be established via a communications network, such as a local area network, a cellular network, the Internet, or the like. The loading station 201 further comprises an interface 210 comprising circuitry and/or devices suitable for enabling the loading station to communicate data with another data processing system. Examples of such interfaces include the examples mentioned in connection with the communications unit 202 above. Further examples include a floppy disk drive, a CD drive, or the like, or any other suitable circuitry or device enabling the loading station to receive payload data to be loaded into the loading station, loading tools or other software to be executed by the loading station, cryptographic data, etc. These data and software may be received via a communications network, e.g. the Internet, or on a storage medium, such as a CD, a floppy disk, a memory card, or the like. The data may be received from one or more servers as will be described below. The received data or software is stored on the storage medium 204, possibly after a verification process and/or further processing. The loading station may be a conventional, suitably programmed computer, e.g. a PC, comprising a suitable communications interface.

The electronic device 205 comprises a corresponding communications unit 206 comprising circuitry and/or devices suitable for enabling the electronic device to communicate data with the loading station. The electronic device further comprises a processing unit 207, e.g. a general- or special-purpose programmable microprocessor, Digital Signal Processor (DSP), Application Specific Integrated Circuit (ASIC), Programmable Logic Array (PLA), Field Programmable Gate Array (FPGA), etc., or a combination thereof. The processing unit 207 is adapted, e.g. by software loaded from the storage medium 208 of the electronic device, to receive data from the loading station, to analyse and verify any header information, and to load the actual payload data into the storage medium 108. If applicable, the processing unit 107 is further adapted to process the payload data, e.g. uncompress or decrypt it.

Figure 3:
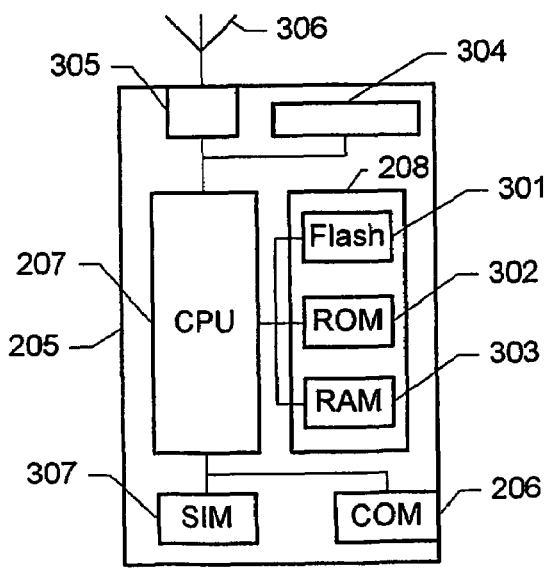
FIG. 3 shows a block diagram of an example of an electronic device.

FIG. 3 shows a block diagram of an example of an electronic device. The electronic device 205 comprises a processing unit 207, as described above, for controlling the functions of the electronic device. The electronic device further comprises a radio interface 305 with an antenna 306 for transmitting and receiving data to/from a wireless communications network, e.g. a cellular network. The electronic device further comprises a user interface 304, e.g. a display, such as an LCD, or the like, a keypad, or other input means, such as a touch screen, or the like. The user interface may be used during the loading process, if the loading is combined with an interactive authentication/approval procedure which requires an input from the user, e.g. the entering of a password, a PIN, or the like. The electronic device may further comprise a subscriber identity module (SIM) 307 including memory for storing subscriber identity information, a telephone number, and other data related to a user's subscription with a cellular network operator. The electronic device further comprises a storage medium 208 which may comprise a RAM section 303, a ROM section 302 and a section 301 comprising flash memory. The payload data received from the electronic device may be loaded in the flash section and/or the RAM section of the memory. Alternatively or additionally, the storage medium of the electronic device may comprise other types of memory, such as EPROM, EEPROM, or the like, or other types of storage media, such as optical disc, digital video disk (DVD), compact disc (CD or CD-ROM), minidisc, hard disk, ferromagnetic memory, optical storage, charge coupled devices, PCMCIA cards, etc. Correspondingly, the received data may be loaded in any of the alternative memory types and/or storage media. In one embodiment of the invention, the data received from the loading station may be loaded into the memory of the SIM 307. Finally, the electronic device comprises a communications unit 206 as described above, e.g. a Bluetooth transceiver, an IrDa port, an USB adapter, a cable connector, or the like. Alternatively, the radio interface 305 may be used to receive the data over the air via a cellular network. For example, the electronic device may be any portable radio communication equipment, where the term portable radio communication equipment includes all equipment such as mobile telephones, pagers, communicators, i.e. electronic organisers, smart phones, personal digital assistants (PDAs), handheld computers, or the like. Another example of an electronic device comprises a chipset for use in a mobile telephone or another type of electronic equipment, where the chipset may comprise a memory component and a processor, e.g. as exemplified by blocks 207 and 208. Optionally, the chipset may comprise one or more of the other blocks shown in FIG. 3, e.g. the communications unit 206 and/or the radio interface 305.

Figure 4:
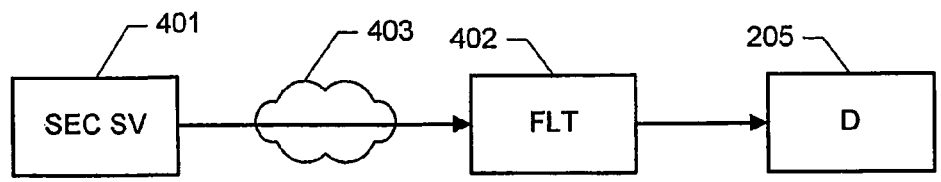
FIG. 4 shows a block diagram of a system for loading software and data into an electronic device and for customising an electronic device during the production process.

FIG. 4 shows a block diagram of a system for loading software and data into an electronic device and for customising an electronic device during the production process. The system comprises a security server 401 a factory loading station 402 and an electronic device 205. The security server 401 may be a personal computer, a work station, a network server, a web server, etc. The security server is connected to a computer network 403, e.g. the Internet, a local area network, an intranet, an extranet, etc. The loading station 402 is a computer with access to the computer network 403 and adapted to execute a computer program for loading software/data onto the electronic device 205, e.g. as described in connection with FIG. 2.

The security server 401 is adapted to distribute computer programs and corresponding updates via the computer network 403 to the loading station 402 and, similarly, to other loading stations (not shown), i.e. computer programs to be run on the respective loading stations for customising and loading software/data into the electronic device 205 and corresponding other electronic devices (not shown). The security server 401 further distributes computer programs and data to be downloaded into the electronic devices by the loading stations and the security server may further provide additional services such as news, information, customer specific services, etc. Alternatively or additionally, the security server may distribute computer programs, data, etc., via any other suitable means, e.g. on a computer-readable medium such as a floppy disk, a CD ROM, etc. However, a connection via a computer network facilitates the implementation of automatic update mechanisms, version control mechanisms, etc.

The loading station 402 is adapted to provide security services related to the customisation of the electronic device 205 and the loading of software/data into the device 205. The security functions may include the generation of signatures based on the factory private key as described above, the generation of the protectable identifier, e.g. in connection with an IMEI, as described above. Further examples of such security services include security functions in connection with the communication between the loading station and the electronic device, such as calculation of checksums, cryptographic functions, compression, etc. In one embodiment where the electronic device includes a mobile terminal, the security functions may further comprise the generation and encryption of SIMlock codes or the like. The loading station further provides functionality for customising the software to be loaded into the electronic device, e.g. by providing language files, customer-specific software, games, etc.

FIGS. 5a-b show block diagrams of embodiments of a system for re-customising an electronic device. As described in connection with FIG. 1, the factory tools do not work anymore, once the electronic device has left the production process, i.e. one the factory public key has been replaced by a product public key. Instead, a special tool is used for reloading customisation files by a customer if necessary.

FIG. 5a shows a block diagram of an example of a system for re-customising an electronic device. The system comprises a security server 401 as described in connection with FIG. 4, a customer tool server 501, a re-customisation station 502, a customer server 503, a signature server 504, and an electronic device 205 to be customised. The re-customisation station 502 is a specially adapted loading station which is connected to the electronic device 205 as described in connection with FIG. 2. The customer tool server 501 may be a personal computer, a work station, a network server, a web server, etc. that is connected to the computer network 403. The customer tool server 501 receives computer programs, updates, etc. from the central security tool server 401, and makes them available for the customer-owned re-customisation tool 502. Hence, the re-customisation tool may automatically be updated from the customer tool server when connected to it.

The customer server 503 may be a fileserver in a computer network 505 of the customer, e.g. a local area network, and intranet, or the like. Alternatively, the customer server may be a web server providing access via the internet or another communications network. Any re-customisation files, e.g. comprising data, compiled computer programs, or the like, are stored in a predetermined location of the filesystem of the customer server 503. The system further comprises a signature server 504 connected to the computer network 505 and adapted to monitor the above location for files which are not provided with a corresponding signature. If such a file is found, the signature server 504 is adapted to sign that file with the product private key and store the signed file at the above or another predetermined location on the customer server 503. Subsequently, the re-customisation station 502 retrieves the signed file(s) from the customer-server and loads the file(s) into the electronic device after performing the security checks as described in connection with FIG. 1.

FIG. 5b shows a block diagram of another example of a system for re-customising an electronic device. As the system of FIG. 5a, the system of FIG. 5b comprises a security server 401, a customer tool server 501, a re-customisation station 502, a signature server 504, and an electronic device 205 to be customised. According to this example, a client program is executed on the re-customisation station 502 which sends the re-customisation file(s) directly to the signature server 504. After signing the file(s), the signature server 504 returns the file(s) to the re-customisation station 502 which subsequently loads the file(s) into the electronic device after performing the security checks as described in connection with FIG. 1.

FIG. 6 shows a block diagram of a system for managing cryptographic keys and certificates. The system comprises a certificate management system 601, a certificate warehouse system 602, a signature server 504, and a loading system 603. The certificate management system 601 may comprise a suitably programmed personal computer, a work station, a network server, a web server, etc. and is connected to the certificate warehouse system 602 via a computer network, e.g. the Internet, a local area network, an intranet, an extranet, etc. The certificate management system 601 is adapted to authorise key signing, assign key identifiers to keys and to sign keys with a manufacturer root key of a hierarchical key structure in order to increase the security of the system.

The certificate warehouse system 602 may comprise a suitably programmed personal computer, a work station, a network server, a web server, etc. The certificate warehouse system 602 is adapted to generate pairs of public and private keys according to a suitable public key mechanism. The customer certificate warehouse system 602 further requests an authentication from the certificate management system and requests the generated public key to be signed with the manufacturer root key by the certificate management system 601. The signed public key is stored in the certificate warehouse system 602 and forwarded to the loading system 603. The loading system 603 loads the public key into the electronic device.

For example, in connection with product keys, the loading system is comprised in the production system for the electronic device and it loads the product public key at the end of the production process as described in connection with FIG. 1. An example of an production system was described in connection with FIG. 4 above.

Similarly, the factory keys and/or prototype keys can be distributed by a system according to FIG. 6.

The generated private keys are stored in the customer certificate warehouse system 602, preferably in encrypted form, and transported to the signature server 504 via a secure channel.

FIGS. 7a-d illustrate examples of production processes according to corresponding embodiments of the invention.

Figure 7A:
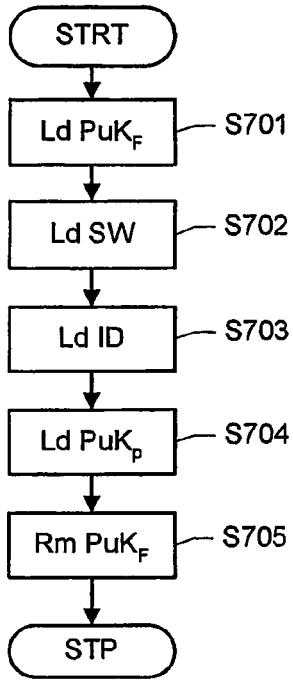

In the example of FIG. 7a, the loading steps are performed in the order according to the example described in connection with FIG. 1 above, i.e.
 Step S701: Load factory public key.
 Step S702: Load factory software.
 Step S703: Load protectable identifier.
 Step S704: Load product public key.
 Step S705: Disable factory public key.

Figure 7B:
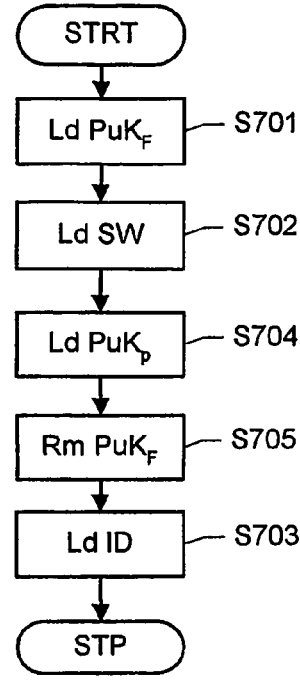

In the example of FIG. 7b, the protectable identifier is loaded at the end of the production process, i.e. the order of loading steps is
 Step S701: Load factory public key.
 Step S702: Load factory software.
 Step S704: Load product public key.
 Step S705: Disable factory public key.
 Step S703: Load protectable identifier.

It is noted that in connection with the loading step S4 as described in connection with FIG. 1, the loading of the product public key included a verification that the protectable identifier was set. It is understood that in the example of FIG. 7b, this verification is not applicable, as the protectable identifier is set after the loading of the product public key. It is further understood that a corresponding consideration applies to the following examples.

Figure 7C:
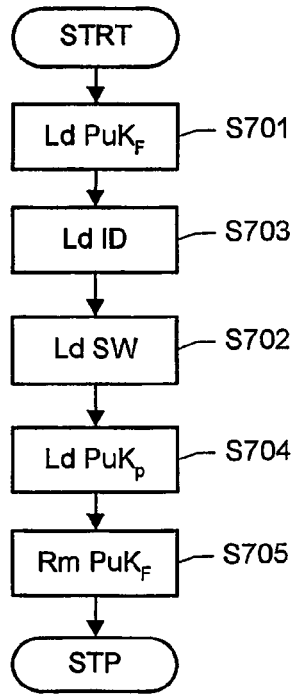

In the example of FIG. 7c, the protectable identifier is loaded before loading the factory software, i.e. the order of loading steps is
 Step S701: Load factory public key.
 Step S703: Load protectable identifier.
 Step S702: Load factory software.
 Step S704: Load product public key.
 Step S705: Disable factory public key.

Figure 7D:
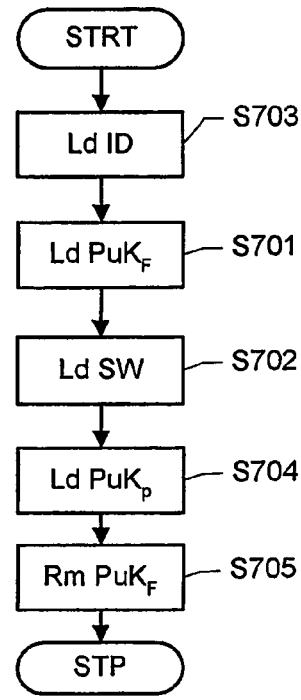

In the example of FIG. 7d, the protectable identifier is loaded before loading the factory software, i.e. the order of loading steps is
 Step S703: Load protectable identifier.
 Step S701: Load factory public key.
 Step S702: Load factory software.
 Step S704: Load product public key.
 Step S705: Disable factory public key.

It is noted that in the above examples, alternatively, other orders of loading steps may be employed. For example, the steps S704 and S705 may be reversed, or combined in a single step, e.g. by overwriting the factory public key with the product public key.

Hence, in the above a production process for an electronic device has been disclosed which provides a high level of security.

It is understood that the production process according to the invention may be used in a number of different contexts. For example, it is a common problem for manufacturers of electronic devices that an increasing part of the software for the electronic devices is developed by third party companies. It is an advantage of the present invention that it provides a mechanism for controlling prototypes of an electronic device and ensuring that prototype software cannot run on a final product.

In one embodiment, during the production of prototype devices, the product public key loaded into the device at the end of the production process is a special public prototype key. Hence, a number of prototypes are produced having a public prototype key, thereby allowing a third party software developer to load software signed with a corresponding private prototype key. The signing of the software may be performed by the third party supplier or by the manufacturer. If there are more than one third party software developers, a corresponding number of different prototype key pairs may be used, thereby allowing the manufacturer to differentiate between different third party suppliers. Hence, according to the invention, a third party software supplier has the possibility to test the software in a realistic environment while, at the same time, ensuring that the software cannot be directly loaded into the final product, since the product devices are equipped with a product public key different from the prototype keys. Hence, without knowledge of the corresponding product private key, the third party supplier cannot load its software into the product.

A prototype public key may be related to a corresponding certificate, thereby providing a possibility of imposing a time limit on the validity of the prototype key.

In another embodiment, the prototype keys may be activated and/or deactivated by a command message sent to the electronic device over-the-air. For example, in the context of mobile terminals, a message of a short message service (SMS) may be sent to the mobile terminal, the message comprising a predetermined deactivation command and, preferably, a digital signature, e.g. in a message header. In the mobile terminal, the message is routed to a respective application which checks the signature and deactivates the mobile terminal for use as a prototype, e.g. by disabling the public prototype key or in another suitable manner.

Preferably, the digital signature corresponds to the prototype key in the mobile terminal, thereby ensuring that only the owner of the corresponding private prototype key may issue a valid deactivation message.

Furthermore, by using a time-stamp, e.g. included in the data to be signed, a re-use of a previously sent message can be prevented.

If the message includes a suitable device identifier, such as the IMEI of the mobile terminal, the message may be made specific for only one device.

FIG. 8 illustrates the structure of an embodiment of a protectable identifier. The protectable identifier, generally designated 800, comprises four components that encode the information used for the security management: a customer identifier (CID) 803, a product state mask (PSM) 804, an International Mobile Equipment Identity (IMEI) 805, and a lock status (OTPLS) 802. In the example of FIG. 8, the protectable identifier comprises the contents of a 64-bit OTP memory section 801 that encode the CID, the PSM, and the IMEI. The CID is encoded as 11 bits, the PSM as a single bit, and the IMEI is encoded as a compact encoding of the standardized IMEI requiring 52 bits. The encoded IMEI will be referred to as EIMEI. It is noted that the IMEI refers to a unique number given to every mobile telephone. IMEI numbers of cellular phones connected to a GSM network are stored in a database (EIR—Equipment Identity Register) containing all valid mobile phone equipment. When a phone is reported stolen or is not type approved, the number is marked invalid. The number comprises a type approval code (TAC), a country code, an assembly code, a manufacturer identifier, and a serial number. The IMEI is an 18-byte identifier of the form dddddd-dd-dddddd-d where d $\in \{0,1,2,\ldots,9\}$. For example, the IMEI can be encoded by encoding the two 6 digit groups into a binary representation and the remaining three digits as binary encoded hex digits. This requires 52 bits (20+8+20+4). Assuming that all digits can occur the minimal encoding of the IMEI requires 50 bits. Hence the above coding is only two bits longer than the minimal value. Since the longest part is only 20 bits long the above coding is easily implemented on standard 32-bit processors used in mobile devices.

The lock flag is encoded by the lock mechanism provided by the OTP memory used. For example, in one embodiment the OTP memory section of a flash memory may be locked by writing, via a predetermined irreversible command of the flash memory, a predetermined value into a lock bit, indicating that the OTP memory section is locked.

It is understood that the above parameters may be encoded by alternative representations. The 64 bit encoding of FIG. 8 is advantageous as many state-of-the art flash memories (regarded as a component) have a 64-bit user programmable OTP area outside the normal address space of the memory. This allows the realization of the management system at no additional hardware costs for the flash memories. For example, in an alternative embodiment, the IMEI may be encoded as 15 binary encoded hex digits (thus omitting the three markers ("-") having fixed positions). This requires 60 bits for storage.

FIG. 9 illustrates a security state diagram. The security state diagram generally designated 900 comprises security states of a life cycle comprising a production state 901, a product development or R&D state 902 and a consumer product state 903, and the transitions between them. It is understood that, in alternative embodiments, the security state diagram may include additional and/or alternative states. For example, by differentiating between different R&D centres, such as different third party development centres, each of these centres could use special mobile phones during development, if each centre uses its own certificate in the mobile phones.

The states of the state diagram are associated with respective values of the protectable identifier and with respective certificate categories. In the following a compact format of a digital certificate including certificate category information is described.

Standard certificates, e.g. certificates according to the X509 V3 standard, allow the signer (the issuer) of the certificate to bind (by means of so-called extensions) the public key to additional information that describes what purpose the public key can be used for when presenting the certificate. However, the encoding of these certificates is complex because of the many fields that have to be present and the special encoding via the ISO ASN.1 DER/BER encoding rules. The software needed for parsing the certificates is complex and requires tens of kilobytes code when implemented. Such code sizes are typically too large for software that has to be ROMed into the controller chip of e.g. a mobile telephone or the like.

Since, according to the methods described herein, the certificates are used in the limited context of SW signing for a certain class of products, the certificate format of X509 is not only complex it is also inefficient for the specific purpose. The above disadvantages are remedied by using a compact certificate format, e.g. the format exemplified in the following table:

| ITEM | DESCRIPTION |
|---|---|
| Version no | certificate format version number |
| CID_O | CID of certificate owner |
| CID_I | CID of certificate issuer |
| Depth | depth in certificate chain |

| ITEM | DESCRIPTION |
| --- | --- |
| Valid Until | expiry date of certificate |
| Signed Date | date of signing |
| ISM | index of signing method |
| PKUC | public key usage category, indicating the category of the digital certificate |
| PKDATA | the public key |
| SIGN | digital signature (according to the signing method indicated by ISM). |

In a preferred embodiment, the binary encoding of certificates is done such that its fields are easily parsed by an application, e.g. in Java, without many conversions. Here it is advantageous, albeit less compact, to have many fields represented as (binary) 32 bit integers.

Hence, the above format provides an efficient and compact certificate format.

The usage limitations of the public key when presenting the certificate are efficiently handled by encoding of usage category codes that are assigned to the distinct usage environments. In the following, for the sake of simplicity of the description, each usage category will be associated with a colour. It is understood, however, that in a practical implementation the usage categories are encoded digitally, e.g. as described above. For example, for the purpose of the present description, the factory environment can be assigned color "White", the R&D (development) environment color "Purple", and the end-user (final product) environment color "Yellow".

Hence, in the state diagram 900, each of the states 901, 902, and 903 corresponds to a different category of public certificates, each category being labelled by a "color": State 901 corresponds to a "white" certificate, state 902 corresponds to a "purple" certificate, and state 903 corresponds to a "yellow" certificate.

The states are encoded by the protectable identifier. In one embodiment, where the permanent identifier is encoded as described in connection with FIG. 8, the three states of the state diagram are encoded as follows:

Factory state 901: The OTP is unlocked. Furthermore, the electronic device comprises no valid certificate or a factory ("white") certificate.

R&D state 902: The OTP is locked and comprises a customer ID and/or an encoded IMEI (optionally a test IMEI), and the product state mask is set to PSM=O.

Product state 903: The OPT is locked and comprises a customer identifier (CID), an encoded IMEI, and the product state mask is set to 1. Furthermore, the electronic device comprises a valid product ("yellow") certificate.

Hence, in one embodiment, the protectable identifier is indicative of the customer ID and the category ("color") of the certificate, i.e. the corresponding state of the security state diagram. In particular, the category of the certificate can be derived from a combination of the fields of the protectable identifier.

It is noted that, in some embodiments, alternative or additional state codes may be used. For example, in connection with devices that are only used in the R&D environment, e.g. early prototypes, an all-zero OTP value (OTP="000 . . . 00") may be used as a possible code in association with non-product states, i.e. states 901 and 902. In this embodiment, the factory and the R&D states can be distinguished by means of the category ("color") of the certificate. The current OTP memories have the property that the OTP bits are initially (i.e. when the OTP memory is delivered for use in a device) all in the "1" position. As long the OTPLS is unlocked it is possible to write a zero ("0") into a "1" position. However, the reverse process, i.e. writing a "1" into a position that was previously set to "0", is not possible. Hence, once being brought into the all zero state, the OTP bits cannot be changed. However, it is understood that other OTP technology could result in a different preferred coding. For example, an alternative OTP may have a similar behaviour but allowing only transitions from 0's to 1's. Hence, by using the all zero OTP value and associating it with the non-product environment one obtains a robust state definition when experimenting with the device hardware in the R&D environment. Furthermore, one still can secure a clear distinction between the R&D and product state (environment) as needed by the reprogramming tools to tell the states of the device apart and prevent unauthorized state transitions.

The transitions between the states 901, 902, and 903 are marked respective arrows: Arrow 912 corresponds to a transition from the production state 901 to the R&D state 902, arrow 921 corresponds to a transition from the R&D state 902 to the production state 901, arrow 913 corresponds to a transition from the production state 901 to the end-product state 903, arrow 931 corresponds to a transition from the end-product state 903 to the production state 901, arrow 923 corresponds to a transition from the R&D state 902 to the end-product state 903, and arrow 932 corresponds to a transition from the end-product state 903 to the R&D state 902. In order to ensure the security, not all of the above transitions are allowed. In the example of FIG. 9, only the transitions 912 and 913 are allowed, while the remaining transitions are forbidden transitions as indicated by the dashed arrows. Hence, in this embodiment, only the factory is allowed to change a certificate.

Each transition between states corresponds to a change in the parameters of the protectable identifier. For example, Transition 912 is indicated by the storing of a CID and/or a test IMEI into the OTP, and by locking the OTP.

Transition 913 is indicated by storing a CID and/or a product IMEI into the OTP and by setting the product state mask to PSM=1.

Hence, a software loader module can exploit the coding of the states in the life cycle state diagram in order to make a distinction between the states. In one embodiment, a software loader module is configured to only execute, if the CID in the OTP is valid. When the loader module is further configured to only accept software that can be verified with a certificate installed in the electronic device, and when the boot ROM of the electronic device only accepts a loader that can be verified with an installed certificate, an efficient and security binding between hardware and software is provided.

Furthermore, recovery loaders can exploit the coding of the states in the life cycle state diagram in order to recover a state of the state diagram, e.g. after the loaded data has been corrupted. In FIG. 9, this is indicated by arrows 911, 922, and 933. For example, an embodiment of a recovery process for recovering a corrupted public key may be performed as follows: Initially, a recovery loader program is loaded into the device. Subsequently, the recovery loader determines whether a valid public key is stored in the key memory of the device. If such a key is detected, the recovery process is terminated. Otherwise, the recovery loader determines the state of the life cycle state diagram by detecting the OTP settings, e.g. the product state mask etc. described above, and loads the public key corresponding to the detected state.

Hence, in the above a method and means are disclosed to securely handle device reprogramming capabilities during the different stages of the device from factory to R&D and final end-user product.

It is noted that the features of the methods described above may be implemented in software and carried out in a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

It is noted that the term "electronic device" is intended to comprise any device comprising processing means and a memory. The term processing means comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Examples of such electronic devices include computers, such as stationary and portable PCs, stationary and portable radio communications equipment, etc., and in particular components thereof, such as processing units, chip sets or the like. The term portable radio communications equipment includes mobile radio terminals such as mobile telephones, pagers, communicators, e.g. electronic organisers, smart phones, personal digital assistants (PDAs), or the like.

It is further noted that the term "loader module" is intended to comprise any device or circuitry adapted to load data and/or software into the electronic device. The device may comprise a suitably programmed processor and an interface for loading the data/software onto the electronic device. Furthermore, the loader module may be implemented as a computer program or a component of a computer program adapted to be executed on a data processing system having communication circuitry adapted to communicate with the electronic device via a data communications link.

It is further noted that the term "hash value" is intended to refer to a one-way representation of the secret data item, i.e. a representation in which it is computationally infeasible to deduce the secret data item from the representation and where two different secret data items yield two different representations.

It is further noted that the term "factory software" is intended to comprise any computer-executable instructions loaded into the electronic device during production. The factory software may be executed during production, e.g. for testing of hardware components, calibration of components, e.g. the radio circuit of a mobile telephone, setting of parameters, customisation, etc. Alternatively or additionally, the factory software may comprise instructions to be executed after completion of the production, e.g. pre-installed operating systems, etc. Hence, the factory software may be loaded permanently or temporarily into the electronic device.

The invention claimed is:

1. A method of loading data into an electronic device, the electronic device comprising a data memory for storing data items and a key memory for storing at least one cryptographic key of a cryptographic public key mechanism, the method comprising:
    loading a factory public key ($PuK_F$) into the key memory;
    loading factory software signed with a factory private key ($PrK_F$) corresponding to the factory public key into the data memory;
    loading into the key memory a product public key ($PuK_P$) different from the factory public key for verifying subsequent data items to be loaded into the data memory after delivering the electronic device to a customer, the subsequent data items being signed with a corresponding product private key ($PrK_P$); and
    disabling the factory public key ($PuK_F$) prior to delivering the electronic device to the customer, wherein the loading of the product public key ($PuK_P$) causes the factory public key ($PuK_F$) to be disabled.

2. The method according to claim 1, wherein the method further comprises the step of setting a protectable identifier in the electronic device indicative of a completion of a production process.

3. The method according to claim 2, wherein the step of loading the factory public key comprises the steps of:
    detecting whether the protectable identifier is set;
    if the protectable identifier is set, aborting the step of loading the factory public key; otherwise loading the factory public key.

4. The method according to claim 2, wherein the step of loading the product public key comprises the steps of:
    detecting whether the protectable identifier is set;
    if the protectable identifier is set, loading the product public key; otherwise aborting the step of loading the product public key.

5. The method according to claim 2 wherein such steps are performed in a mobile telephone having associated with it an International Mobile Equipment Identity; and the protectable identifier comprises the International Mobile Equipment Identity and a further identifier stored in a one time programmable arrangement.

6. The method according to claim 1 wherein such steps are performed in a mobile telephone.

7. The method according to claim 1 wherein the steps performed in the data memory and the key memory occur in selected blocks of a flash memory.

8. The method according to claim 1 wherein the method further comprises the step of loading a hash value of a secret data item into the key memory.

9. The method according to claim 8, wherein the secret data item is selected individually for each electronic device.

10. The method according to claim 8 wherein the hash value is determined by a method that depends on the electronic device.

11. The method according to claim 1 wherein the step of loading a product public key further comprises the step of loading a digital certificate comprising the product public key, the digital certificate being associated with a validity period limiting the validity of the public key.

12. The method according to claim 1 wherein the step of loading a product public key further comprises the step of loading a digital certificate comprising the product public key; and the method further comprises the step of subsequently invalidating the digital certificate by sending a predetermined message to the electronic equipment.

13. The method according to claim 1 wherein the product public key is selected from a predetermined set of customer public keys.

14. The method according to claim 13, wherein the set of customer public keys comprises a prototype public key for use with prototypes of the electronic device.

15. A method of re-customizing an electronic device, the method comprising the steps of:
    detecting whether a protectable identifier is set in the electronic device;

obtaining the hash value of the secret data item from the key memory;
comparing the obtained hash value with a reference hash value calculated from a reference secret data item; and if the protectable identifier is set and if the obtained hash value corresponds to the calculated reference hash value, initiating loading re-customization data signed with a product private key ($PrK_P$) into the electronic device; otherwise aborting re-customizing the electronic device;
loading a factory public key ($PuK_F$) into the key memory;
loading a factory software signed with a factory private key ($PrK_F$) corresponding to the factory public key ($PuK_F$) into the data memory;
loading a product public key ($PuK_P$) different from the factory public key ($PuK_F$) for verifying subsequent data items to be loaded into the data memory after delivering the electronic device to a customer into the key memory, the subsequent data items being signed with the corresponding product private key ($PrK_P$); and
disabling the factory public key ($PuK_F$) prior to delivering the electronic device to the customer, wherein the loading of product public key ($PuK_P$) caused the factory public key ($PuK_F$) to be disabled.

16. A system for storing data into an electronic device, the electronic device comprising a data memory for storing data items and a key memory for storing at least one cryptographic key of a cryptographic public key mechanism, the system comprising:
a first loader module for loading a factory public key ($PuK_F$) into the key memory;
a second loader module for loading factory software signed with a factory private key ($PrK_F$) corresponding to the factory public key ($PuK_F$) into the data memory; wherein the system further comprises a third loader module adapted:
to load into the key memory a product public key different from the factory public key ($PuK_F$) for verifying subsequent data items to be loaded into the data memory after delivering the electronic device to a customer, the subsequent data items being signed with a corresponding product private key ($PrK_P$); and
to disable the factory public key ($PuK_F$) prior to delivering the electronic device to the customer, wherein the loading of the product public key ($PuK_P$) causes the factory public key ($PuK_F$) to be disabled.

17. A system for re-customizing an electronic device having stored therein data that has been loaded into the electronic device, the system having a loader module comprising:
means to detect whether a protectable identifier is set in the electronic device;
means to obtain the hash value of the secret data item from the key memory;
means to compare the obtained hash value with a reference hash value calculated from a reference secret data item; and if the protectable identifier is set and if the obtained hash value corresponds to the calculated reference hash value; means to initiate loading re-customization data signed with the product private key ($PrK_P$) into the electronic device; otherwise to abort re-customizing the electronic device;
means for loading a factory public key ($PuK_F$) into the key memory;
means for loading a factory software signed with a factory private key ($PrK_F$) corresponding to the factory public key ($PuK_F$) into the data memory;
means for loading a product public key ($PuK_P$) different from the factory public key ($PuK_F$) for verifying subsequent data items to be loaded into the data memory after delivering the electronic device to a customer into the key memory, the subsequent data items being signed with the corresponding product private key ($PrK_P$); and
means for disabling the factory public key ($PuK_F$) prior to delivering the electronic device to the customer, wherein the loading of product public key ($PuK_P$) caused the factory public key ($PuK_F$) to be disabled.

18. An electronic device comprising:
a data memory for storing data items
a key memory for storing at least one cryptographic key of a cryptographic public key mechanism,
means for receiving a factory public key ($PuK_F$) into the key memory;
means for receiving factory software signed with a factory a private key ($PrK_F$) corresponding to the factory public key ($PuK_F$) loaded into the data memory,
means for verifying subsequent data items to be loaded into the data memory after delivering the electronic device to a customer using a product public key ($PuK_P$) different from the factory public key ($PuK_F$), wherein the subsequent data items are signed with a corresponding product private key ($PrK_P$) and the factory public key ($PuK_F$) is disabled prior to delivering the electronic device to the customer, wherein the loading of product public key ($PuK_P$) causes the factory public key ($PuK_F$) to be disabled.

19. A computer program comprising code means embodied on a computer readable medium and adapted to be executed by a processor operable to perform the steps of:
storing data into an electronic device including a data memory for storing data items and a key memory for storing at least one cryptographic key of a cryptographic public key mechanism;
loading into the key memory a product public key ($PuK_P$) for verifying subsequent data items to be loaded into the data memory after delivering the electronic device to a customer, the subsequent data items being signed with a corresponding product private key ($PrK_P$); the product public key ($PuK_P$) being different from a factory public key ($PuK_F$) stored in the key memory and used for verifying any factory software to be loaded into the data memory and signed with a factory private key ($PrK_F$) corresponding to the factory public key ($PuK_F$); and
disabling the factory public key ($PuK_F$) prior to delivering the electronic device to the customer, wherein the loading of the product public key ($PuK_P$) causes the factory public key ($PuK_F$) to be disabled.

20. A method of protecting an electronic device having a data memory and a key memory, from unauthorized reprogramming, the method comprising the steps of:
loading a factory public key ($PuK_F$) into the key memory;
loading factory software signed with a factory private key ($PrK_F$) corresponding to the factory public key into the data memory;
loading into the key memory a product public key ($PuK_P$) different from the factory public key ($PuK_F$) for verifying subsequent data items to be loaded into the data memory after delivering the electronic device to a customer, the subsequent data items being signed with a corresponding product private key ($PrK_P$);
setting a protectable identifier in the electronic device, where the protectable identifier identifies an entity authorized to reprogram the electronic device; and disabling the factory public key (PuK$_F$) prior to delivering the electronic device to the customer, wherein the loading of the product public key (PuK$_P$) causes the factory public key (PuK$_F$) to be disabled.

21. The method according to claim 20, wherein the protectable identifier identifies a selected one of a number of categories of public keys.

22. The method according to claim 20, wherein the protectable identifier is indicative of a selected one of a number of stages in the life cycle of the electronic device.

23. The method according to claim 20, wherein the protectable identifier identifies a state in a security state diagram, each state representing a stage in the life cycle of the electronic device.

24. The method according to claim 23, wherein at least one of the transitions between states in the security state diagram relate to a corresponding change in the protectable identifier.

25. The method according to claim 20, wherein the protectable identifier is stored in a one time programmable (OTP) memory.

26. The method according to claim 25, wherein the protectable identifier comprises an identifier identifying an entity authorized to reprogram the electronic device, a product state indicator, a lock status of the one time programmable memory, and a product identifier identifying the electronic device.

27. The method according to claim 20, wherein the public key is comprised in a digital signature which is encoded to be directly readable from within Java.

28. The method of loading data into an electronic device protected according to the method of claim 20, the method comprising the further steps of:
   detecting whether the protectable identifier has a predetermined property; and
   if the protectable identifier has said predetermined property, loading the data, the data being signed with said private key; otherwise aborting loading the data.

29. A system for protecting an electronic device comprising:
   a data memory in the electronic device for storing data items; and
   a key memory in the electronic device for storing at least one cryptographic key of a cryptographic public key mechanism;
   means for loading a factory public key (PuK$_F$) into the key memory;
   means for loading factory software signed with a factory private key (PrKF) corresponding to the factory public key (PuK$_F$) into the data memory;
   means for loading into the key memory a product public key (PuK$_P$) different from the factory public key (PuK$_F$) for verifying subsequent data items to be loaded into the data memory after delivering the electronic device to a customer, the subsequent data items being signed with a corresponding product private key (PrK$_P$); and
   means for disabling the factory public key (PuK$_F$) prior to delivering the electronic device to the customer, wherein the loading of the product public key (PuK$_P$) causes the factory public key (PuK$_F$) to be disabled.

30. A system for loading data into an electronic device, comprising:
   the electronic device having a data memory, the data memory adapted to store data items and a key memory for storing at least one cryptographic key of a cryptographic public key mechanism;
   the electronic device adapted to receive a factory public key (PuK$_F$) into the key memory and factory software signed with a factory private key (PrK$_F$) corresponding to the factory public key (PuK$_F$) into the data memory;
   means for providing a product public key (PuK$_P$) different from the factory public key (PuK$_F$) for verifying subsequent data items to be loaded into the data memory of the electronic device after delivering the electronic device to a customer; the subsequent data items being signed with a corresponding product private key (PrK$_P$) wherein the loading of product public key (PuK$_P$) causes the factory public key (PuK$_F$) to be disable prior to delivering the electronic device to the customer;
   a means to set a protectable identifier in the electronic device, where the protectable identifier identifies an entity authorized to reprogram the electronic device; and
   a loader module adapted to detect whether the protectable identifier has a predetermined property; and if the protectable identifier has said predetermined property, to load the data, the data being signed with said private key; otherwise to abort loading the data.

* * * * *

UNITED STATES PATENT AND TRADEMARK OFFICE
CERTIFICATE OF CORRECTION

PATENT NO.         : 7,587,600 B2
APPLICATION NO.    : 10/527031
DATED              : September 8, 2009
INVENTOR(S)        : Bodensjo et al.

It is certified that error appears in the above-identified patent and that said Letters Patent is hereby corrected as shown below:

In Column 10, Line 38, delete "senders" and insert -- sender's --, therefor.

In Column 10, Line 40, delete "holders" and insert -- holder's --, therefor.

In Column 11, Line 47, delete "date" and insert -- data --, therefor.

In Column 21, Line 48, delete "PSM=O." and insert -- PSM=0. --, therefor.

Signed and Sealed this

Seventeenth Day of November, 2009

David J. Kappos
*Director of the United States Patent and Trademark Office*